(12) United States Patent
Newton (10) Patent No.: US 9,070,137 B2
(45) Date of Patent: *Jun. 30, 2015

(54) METHODS AND SYSTEMS FOR COMPILING MARKETING INFORMATION FOR A CLIENT

(71) Applicant: salesforce.com, inc., San Francisco, CA (US)

(72) Inventor: Christopher Daniel Newton, Douglas, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,026

(22) Filed: Aug. 26, 2014

(65) Prior Publication Data

US 2014/0365275 A1 Dec. 11, 2014

Related U.S. Application Data

(60) Division of application No. 13/781,635, filed on Feb. 28, 2013, now Pat. No. 8,843,610, which is a division of application No. 13/526,246, filed on Jun. 18, 2012, now Pat. No. 8,412,820, which is a continuation of application No. 12/819,402, filed on Jun. 21, 2010, now Pat. No. 8,230,062.

(51) Int. Cl.
*G06F 15/173* (2006.01)
*H04L 12/26* (2006.01)
*H04L 29/08* (2006.01)
*G06Q 30/02* (2012.01)

(52) U.S. Cl.
CPC ............ *G06Q 30/0201* (2013.01); *H04L 43/04* (2013.01); *H04L 67/22* (2013.01); *H04L 43/045* (2013.01); *H04L 67/02* (2013.01)

(58) Field of Classification Search
CPC .............. G06Q 30/02; G06Q 30/0201; G06Q 30/0282; G06Q 30/0631; G06Q 50/01; G06Q 17/30598; H04L 67/22; H04L 43/04
USPC .......................... 709/203, 217, 219, 224, 225
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |

(Continued)

*Primary Examiner* — Sargon Nano
(74) *Attorney, Agent, or Firm* — Ingrassia Fisher & Lorenz, P.C.

(57) ABSTRACT

Methods and systems for compiling marketing information for a client are provided. Data can be obtained from a plurality of social media websites, where each of the social media websites includes a universal resource identifier that points to a client website. A plurality of insights can be extracted from the obtained data, resulting in extracted insights. Each of the extracted insights comprises text elements that denote product approval for at least one product available for sale at the client website. Measurements of traffic to the client website can be collected, the traffic being referred to the client website by the plurality of social media websites. A referred traffic dynamics summary table can then be generated based on the extracted insights and the measurements of traffic. The referred traffic dynamics summary table aggregates the extracted insights across the plurality of social media websites to rank the extracted insights.

20 Claims, 5 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,223,177 B1* | 4/2001 | Tatham et al. ............... 1/1 |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,925,441 B1* | 8/2005 | Jones et al. ................ 705/7.33 |
| 6,963,874 B2* | 11/2005 | Kasriel et al. ................ 702/180 |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,601 B2* | 1/2012 | Hnatio ............................ 706/14 |
| 8,135,706 B2* | 3/2012 | Yu et al. ....................... 707/722 |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,595,691 B2* | 11/2013 | Ellen et al. .................... 717/106 |
| 8,620,748 B1* | 12/2013 | Ruarte et al. ................ 705/14.49 |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0242139 A1* | 10/2006 | Butterfield et al. ................ 707/5 |
| 2008/0177678 A1* | 7/2008 | Di Martini et al. ........... 705/412 |
| 2008/0249972 A1 | 10/2008 | Dillon |
| 2009/0018882 A1* | 1/2009 | Burton et al. ...................... 705/7 |
| 2009/0037412 A1* | 2/2009 | Bard et al. ......................... 707/5 |
| 2009/0063414 A1 | 3/2009 | White et al. |
| 2009/0100342 A1 | 4/2009 | Jakobson |
| 2009/0119160 A1* | 5/2009 | Woda et al. ...................... 705/10 |
| 2009/0177744 A1 | 7/2009 | Marlow et al. |
| 2010/0246249 A1* | 9/2010 | Vanhoucke et al. ........... 365/163 |
| 2010/0286937 A1* | 11/2010 | Hedley et al. .................... 702/60 |
| 2011/0004483 A1* | 1/2011 | Ting et al. ...................... 705/1.1 |
| 2011/0252015 A1* | 10/2011 | Bard et al. ...................... 707/706 |
| 2012/0233137 A1 | 9/2012 | Jakobson et al. |

(56) References Cited

U.S. PATENT DOCUMENTS

| | | | |
|---|---|---|---|
| 2012/0324027 A1* | 12/2012 | Vaynblat et al. ............. 709/206 |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

METHODS AND SYSTEMS FOR COMPILING MARKETING INFORMATION FOR A CLIENT

CROSS-REFERENCE TO RELATED APPLICATIONS

This application is a divisional of U.S. patent application Ser. No. 13/781,635, filed Feb. 28, 2013, which is a divisional of U.S. patent application Ser. No. 13/526,246, filed Jun. 18, 2012 (and issued on Apr. 2, 2013 as U.S. Pat. No. 8,412,820), which is a continuation of U.S. patent application Ser. No. 12/819,402, filed Jun. 21, 2010 (and issued on Jul. 24, 2012 as U.S. Pat. No. 8,230,062).

TECHNICAL FIELD

The present invention relates to a computer implemented method and system for determining content in social media, and in particular, to a computer implemented method and system for determining content published by a commenter, an individual, or a web site, and determining its effect on referred web sites.

BACKGROUND

The influence of the social media on the effectiveness of commercial web sites has become an increasingly important subject. A major problem facing marketers and public relation professionals revolves around the prolific use of social media sites and their effect in directing traffic to other web sites, for example E-commerce sites and other corporate sites.

Available web analytics software tools, such as Google Analytics and many other such systems are designed to collect real-time site traffic information and can provide resulting statistics through graphical user interfaces (GUI) and in formatted reports to the operator of E-commerce or other sites instrumented with such web analytics tools.

A brief description of web analytics, provided for example by Wikipedia (http://en.wikipedia.org/wiki/Web_analytics), may be useful to give the reader an introduction to the subject matter:

"Web analytics is the measurement, collection, analysis and reporting of Internet data for purposes of understanding and optimizing web usage. Web analytics is not just a tool for measuring website traffic but can be used as a tool for business research and market research. Web analytics applications can also help companies measure the results of traditional print advertising campaigns. It helps one to estimate how the traffic to the website changed after the launch of a new advertising campaign. Web analytics provides data on the number of visitors, page views etc. to gauge the popularity of the sites which will help to do the market research. There are two categories of web analytics; off-site and on-site web analytics. Off-site web analytics refers to web measurement and analysis regardless of whether you own or maintain a website. It includes the measurement of a website's potential audience (opportunity), share of voice (visibility), and buzz (comments) that is happening on the Internet as a whole. On-site web analytics measure a visitor's journey once on your website. This includes its drivers and conversions; for example, which landing pages encourage people to make a purchase. On-site web analytics measures the performance of your website in a commercial context. This data is typically compared against key performance indicators for performance, and used to improve a web site or marketing campaign's audience response. Historically, web analytics has referred to on-site visitor measurement. However in recent years this has blurred, mainly because vendors are producing tools that span both categories."

A web analytics tool alone can be an important marketing research tool, but while it can provide detailed and summarized information and analysis of the traffic that arrives at a web site, including categorizing sources of the traffic, it cannot determine the reasons for the traffic arriving.

Accordingly, there is a need in the industry for the development of alternative and improved methods and systems, which would take into account individual drivers for Internet traffic on commercial web sites.

BRIEF SUMMARY

Methods and systems for compiling marketing information for a client are provided. Data can be obtained from a plurality of social media websites, where each of the social media websites includes a universal resource identifier that points to a client website. A plurality of insights can be extracted from the obtained data, resulting in extracted insights. Each of the extracted insights comprises text elements that denote product approval for at least one product available for sale at the client website. Measurements of traffic to the client website can be collected, the traffic being referred to the client website by the plurality of social media websites. A referred traffic dynamics summary table can then be generated based on the extracted insights and the measurements of traffic. The referred traffic dynamics summary table aggregates the extracted insights across the plurality of social media websites to rank the extracted insights.

BRIEF DESCRIPTION OF THE DRAWINGS

Embodiments of the invention will now be described, by way of example, with reference to the accompanying drawings in which.

DETAILED DESCRIPTION

In summary, embodiments of the present invention take available information from a web analytics tool that identifies HTTP referrer traffic, and associate or correlate other events such as visits, sales, downloads, etc. recorded on a commercial web site, with text elements found at the referrer site. These text elements (expressions) comprising from one to a few contiguous words, are words or phrases describing, for example, an attribute of a product for sale at the client site, a comment on quality or otherwise of the product, or other meaningful terms. In the following, the commercial web site will be called a client site, and the text elements will be called "insights".

Figure 1:
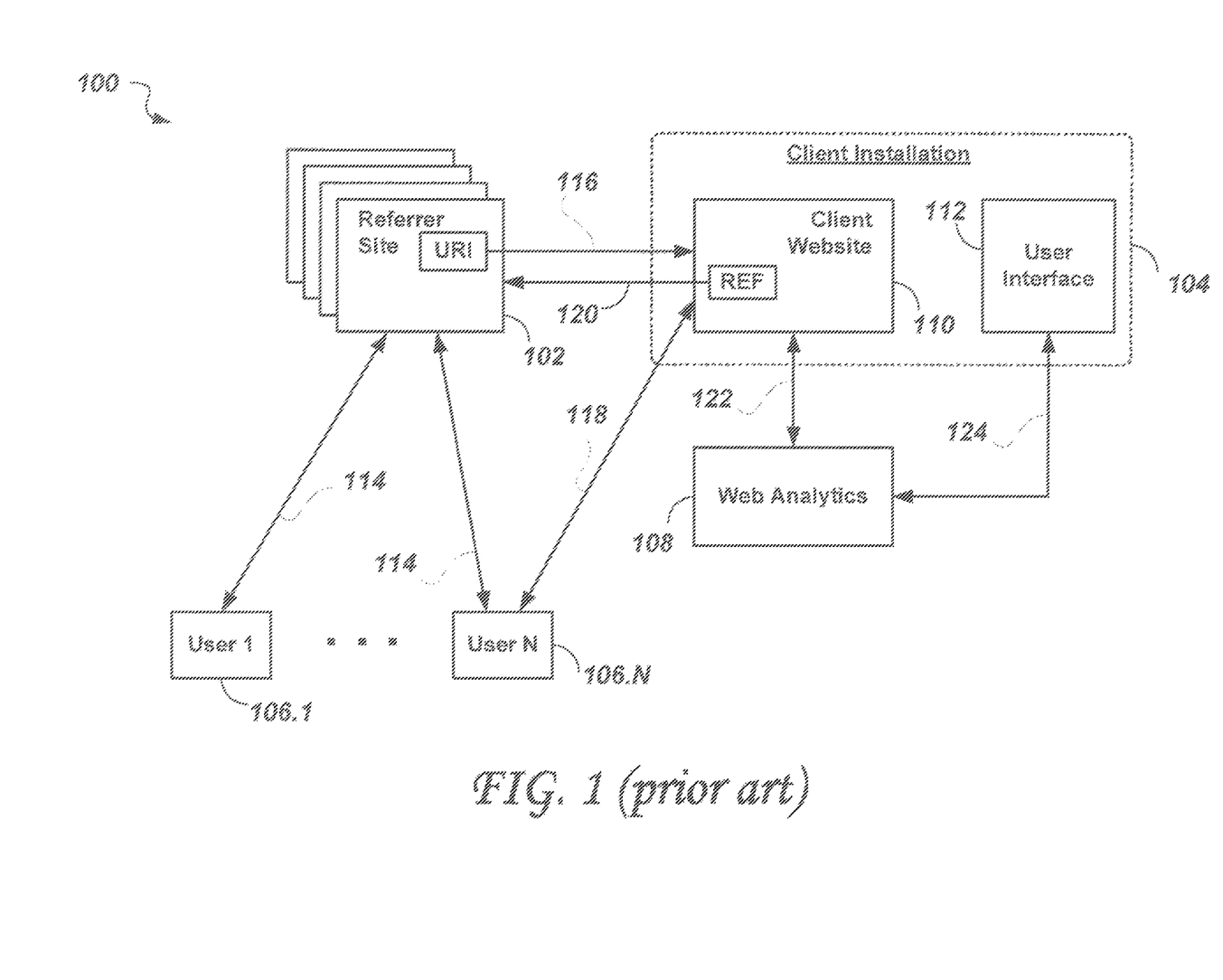
FIG. 1 illustrates a basic system architecture 100 of the prior art, comprising any number of Referrer Sites 102, a Client Installation 104, a number N of Users 106 (User 1 to User N), and a Web Analytics module 108.

FIG. 1 illustrates a basic system architecture 100 of the prior art, comprising any number of Referrer Sites 102, a Client Installation 104, a number N of Users 106 (User 1 to User N), and a Web Analytics module 108. The Client Installation 104 includes a Client Website 110 hosted on a web server and a User Interface 112. The referrer sites 102 may be social media sites, such as a blog, or a news or publication sites carrying reviews for example.

The Web Analytics module 108 may be provided as an in-house tool within the Client Installation 104, but it may also be provided from a server of an external organization such as Google (see http://www.google.com/analytics) or WebTrends (see http://www.webtrends.com) which serves multiple clients.

For the purpose of more clearly showing the communication relationships, connectivity over virtual communications links may be described as follows:

the Users 106 browse to the referrer sites 102 over primary Internet connections 114;

the referrer sites 102 may include a Universal Resource Identifier (URI) which is effectively a pointer 116 to the Client Website 110;

having acquired a URI, a User 106 (User N for example) may establish a secondary Internet connection 118 with the Client Website 110, i.e. the user is redirected to the client website;

as the secondary Internet connection 118 is opened a referrer identifier (REF) is transmitted to the Client Website 110 and stored there, REF being effectively a pointer 120 to the referrer site 102;

the Client Website 110 may communicate with the Web Analytics module 108 over a permanent or periodically established traffic monitoring link 122; and the User Interface 112 may communicate over a permanent or periodically established analytics connection 124 with the Web Analytics module 108.

In a simple sequence of events, a user, e.g. the User N browses to the Referrer Sites 102, which may be a social media site, such as a blog, or a news or publication site carrying reviews, as indicated earlier.

The user may click on a screen element (e.g. a button, or simply text), which is associated with the URI pointing to the Client Website 110. As a result, the secondary Internet connection 118 is activated, and the user interacts now with the Client Website 110.

Activity on the Client Website 110 is monitored over the traffic monitoring link 122 by the Web Analytics module 108 and recorded. Data recorded in the Web Analytics module 108 may then be processed, for example summarized and formatted, and delivered to the User Interface 112 over the analytics connection 124, either as a periodic report or interactively allowing the client to interactively view the data.

What processing in the Web Analytics module 108 of the prior art system 100 may also include, is some listing of the Referrer Sites 102 or their types from which the user may have been redirected.

What the embodiments of the present invention add to this scenario, is to provide the client with additional valuable information by extrapolating from the actual content of the Referrer Site 102, combined with the activity recorded by the Web Analytics module 108, possible motivations of the user, including ranking different Referrer Sites 102 as to their value to in bringing business to the client for example, as well as ranking the "insights" found on the Referrer Sites 102 as to their effect on the users' reactions.

General Description of the Embodiments

A client has a website (ClientWebsite) and a web analytics tool. Web analytics tools of various capabilities are commercially available from companies such as Omniture, Meteorsolutions, WebTrends, and others. The web analytics tool runs on, or is connected to, the same server as the client's website.

Activity on the client's website is constantly monitored by the web analytics tool, which collects statistics of: hits, button presses, enquiries, purchases, etc. as well as the referrer URL of the site that is accessing the client's website. The collected results of the monitored activity are available to the client in various formats. The collected results may also be periodically transmitted in a selected format for further processing.

The client is a client of Radian6 Technologies Inc., to be also referred to as Radian6 for brevity, the assignee for this application, who provides a service to the client. Briefly, a service provided by Radian6 Technologies Inc., the implementation of which is disclosed in the embodiments of the present invention, includes performing additional analysis, specifically by associating or correlating the information gathered by the web analytics tool of the client with third party information gathered by Radian6 Technologies Inc. from publicly accessible third party sites, e.g. social media sites on the web, including social networking sites, blogs, reviews, news agencies, and other similar sites which may contain content relative to the client. The primary key upon which correlation to Radian6 data is performed, is via the referring URL field. However, it is understood that other ways of correlating the collected information are also possible.

Radian6 maintains a database of the aforementioned third party information, which is gathered by a web crawler application periodically and speculatively, for use in providing service to clients. This information may already be available and may have been used in other types of service provided by Radian6, and described in earlier patent applications of the same assignee serial number 12/174,345 filed on Jul. 16, 2008; Ser. No. 12/333,277 filed on Dec. 11, 2009 and Ser. No. 12/437,418 filed on May 7, 2009, entire contents of the patent applications being entirely incorporated herein by reference. Some third party information may also be included in the web crawler collection activity on demand, as a result of new keywords (trigger or search terms) being requested by the client.

Not all referrer sites are of interest to Radian6, for example search sites (Google etc.). Conversely, not all referrer URLs may be known to Radian6, e.g., in-house sites, or referrer sites that were active only a short time, and were missed by the web crawler.

The client has to manually set up the data integration of their web analytics tool with Radian6 through a registration process. A typical example of service setup requires these fields:

Client Account Name (and Client ID)

Name of the Topic Profile

Application "id" of the report being transferred from the web service running the web analytics tool, to Radian6

API URL that Radian6 will use to request the report

Supply a username/password if required to request the report from the web service The time of day that Radian6 should request the report from the web analytics tool web service (including the time zone)

Names of the measures to be included in the report (up to 10 events) from the web analytics report These will also become the names used as the menu options in a sample screenshot Provide the list of measures in the desired sort order for how the measures will be sorted in the menus in the Radian6 user interface Note that Radian6 needs to be notified if the measures in the report change in order to keep the data load running properly Domain of the site that measures are being gathered for (i.e., www.radian6.com)

Multiple domains can be supported

The setup results in defining a database schema, including up to K (K=10) measures of interest to the client. There can be any number of sets of 10 measures configured in a Radian6 web analytics configuration. It is also understood that K=10 has been selected for convenience, and generally K may be higher or lower than 10 as required.

Once a client is set up, their collected set of measurements is periodically sent in a report to Radian6 and stored in a rolling database that keeps the current and last N reports, for possible trends analysis.

Each time a report is received from the web analytics tool of the client, an SQL (mySQL) program (a data processing job) is run on the collected measurements in combination with the "insights" collected from the referring sites. The outcome of the data processing job for the client's domain comprises one or more basic correlation records, typically of the form:

key word term, provider URL, client website action (e.g. conversion), count thus tying social media topics and conversations to specific actions and objectives on the client's website.

Conversions are defined by the client, depending on the desires of the client. If the client desires to attract a visitor to the client's website and get the visitor to download a white paper, then that is a conversion. If the client desires to get someone to buy a widget, then that is what they define as a conversion.

The basic correlation records are then further processed by Radian6 to generate various summaries, which are displayed in an interactive format, at the client's or any other location.

DETAILED DESCRIPTION OF THE EMBODIMENTS

Figure 2:
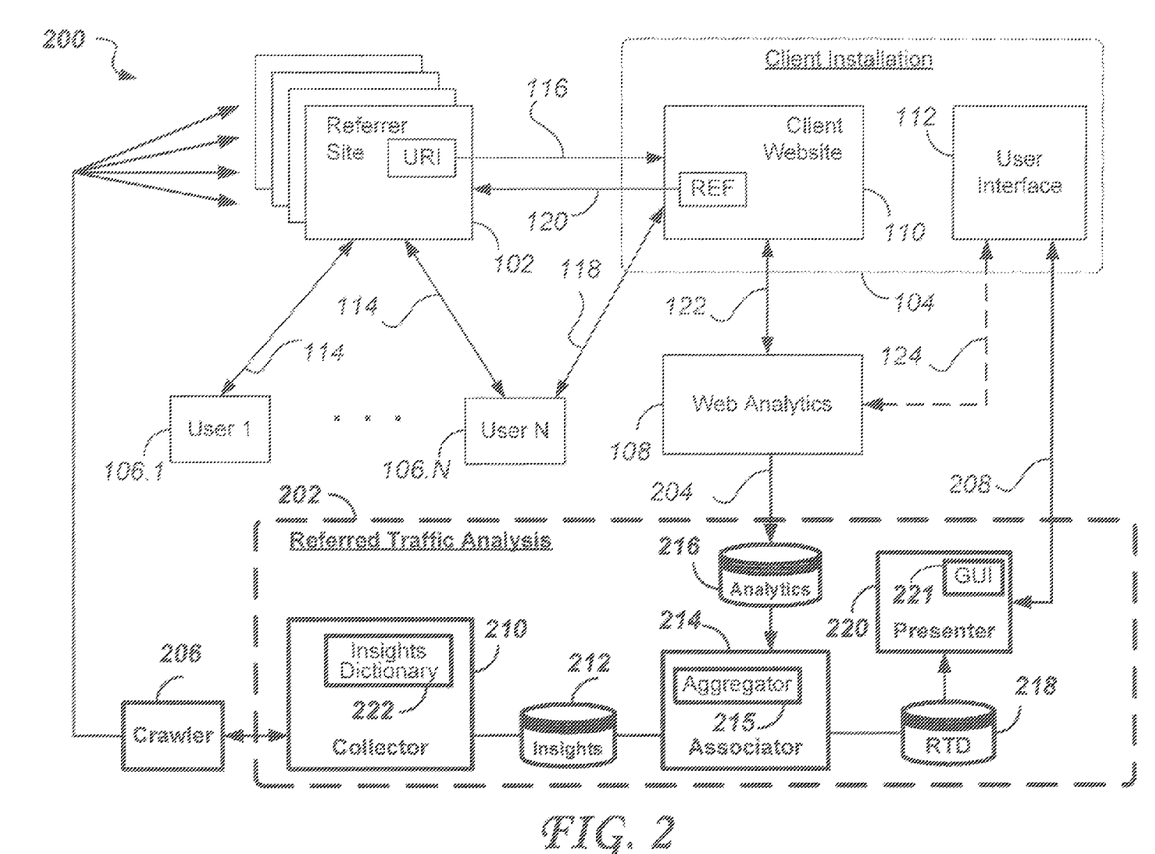
FIG. 2 shows a system architecture 200 according to embodiments of the invention, including a Referred Traffic Analysis System 202.

FIG. 2 shows an improved system architecture 200 according to the embodiments of the invention, including the basic system architecture 100. But instead of (or in addition to) communicating the results of the Web Analytics module 108 directly over the analytics connection 124 to the Client Installation 104, the improved system architecture 200 comprises a Referred Traffic Analysis System 202, which receives formatted analytics data from the Web Analytics module 108 over a web analytics output connection 204, associates or correlates the received formatted analytics data with content gathered from the referrer sites 102 by a Web Crawler (a crawler module) 206, and provides the correlation results as "referred traffic dynamics" over an interactive Internet link 208 to the client, i.e., the User Interface 112.

The Web Crawler 206 may be an available computer program or a service which, given a priming source (initial target) and search criteria from the Referred Traffic Analysis System 202, will gather many crawled web pages and deliver their content to the Referred Traffic Analysis System 202 for further processing.

The Referred Traffic Analysis System 202 comprises one or more computers having processors, computer storage subsystems, having computer readable media such a memory, DVD, CD-ROM or else, network interfaces, and software designed to be executed on said computers, the software having computer executable instructions and data stored on the computer readable media for execution by a processor, forming various modules of the Referred Traffic Analysis System 202 as shown in FIG. 2.

The Referred Traffic Analysis System 202 may simultaneously provide an insight correlation service to numerous client installations similar to the Client Installation 104, as well as provide other computational services outside of the scope of the present invention. The Referred Traffic Analysis System 202 may reside in a single location, or it may be a distributed system with computer and storage subsystems located in several locations. In the interest of clarity, only a simplified view of the Referred Traffic Analysis System 202, serving a single client (the Client Installation 104) is described in the following. Persons conversant with designing server systems and server applications may readily conceive of expanded systems which are within the scope of the present invention.

The Referred Traffic Analysis System 202 comprises: a Collector module 210, an Insights database 212, an Associator module 214 including an Aggregator module 215, an Analytics database 216, a Referred Traffic Dynamics (RTF) database 218, and a Presenter module 220 including a Graphical User Interface module 221. Each of these modules comprises a computer readable program code and/or data stored in a computer readable medium for execution by a processor.

The Collector module 210 is a software program, stored in a memory, and running in one of the computers of the Referred Traffic Analysis System 202, which crawls the Internet to find Referrer Sites 102, that is social networking as well as other sites that include a URI pointing to the Client Website 110. The Collector module 210 includes an Insights Dictionary 222 of "insights", that is to say, words or short phrases that may indicate for example a value statement, or generally terms that are commonly used in social networking sites to denote product approval. The Insights Dictionary 222 may also be customized to include terms specific to the Client Installation 104 such as product names. As mentioned above, the Insight Dictionary 222 comprises computer readable program data stored in a computer readable medium for execution by a processor.

The contents of each Referrer Site 102 are compared with the insights listed in the Insights Dictionary 222, and insights found on each Referrer Site 102 are stored in the Insights database 212 with the Universal Resource Locator (URL) of the respective Referrer Site 102.

The Analytics database 216 periodically receives selected analytics data from the Web Analytics module 108 over the web analytics output connection 204. The selected analytics data stored in the Analytics database 216 include measurements, i.e., frequency, time, referring link, etc., of one or more of the following events: visits to the client website, number of orders of products from the client website, number of orders of products from the client website divided into a category, and number of downloads from the client website.

The Associator module 214 is a software program, stored in a memory, and running in one of the computers of the Referred Traffic Analysis System 202, which combines data from the Insights database 212 and the Analytics database 216 to periodically generate or update a set of Referred Traffic Dynamics for storage in the RTF database 218. The Aggregator module 215 of the Associator module 214 aggregates may be used to aggregate the results of the Referred Traffic Dynamics according to predefined criteria, for example.

The Presenter module 220 is a software program, stored in a memory, and running in one of the computers of the Referred Traffic Analysis System 202, which makes the contents RTF database 218 accessible over the interactive Internet link 208, preferably through the Graphical User Interface module (GUI) 221, to the User Interface 112 in the Client Installation 104. The Presenter module 220 may for example present the RTF data in a website and the interactive Internet link 208 is a hypertext transport protocol (HTTP) link.

The Collector module 210, the Associator module 214, and the Presenter module 220, may conveniently be implemented as Hypertext Preprocessor (PHP) programs, while the Insights database 212, the Analytics database 216, and the RTF database 218 may be relational databases which permits many of the database functions such as sorting, filtering, associating, etc., of the software modules (210, 214, 220) to be performed using the Structured Query Language (SQL).

Figure 3:
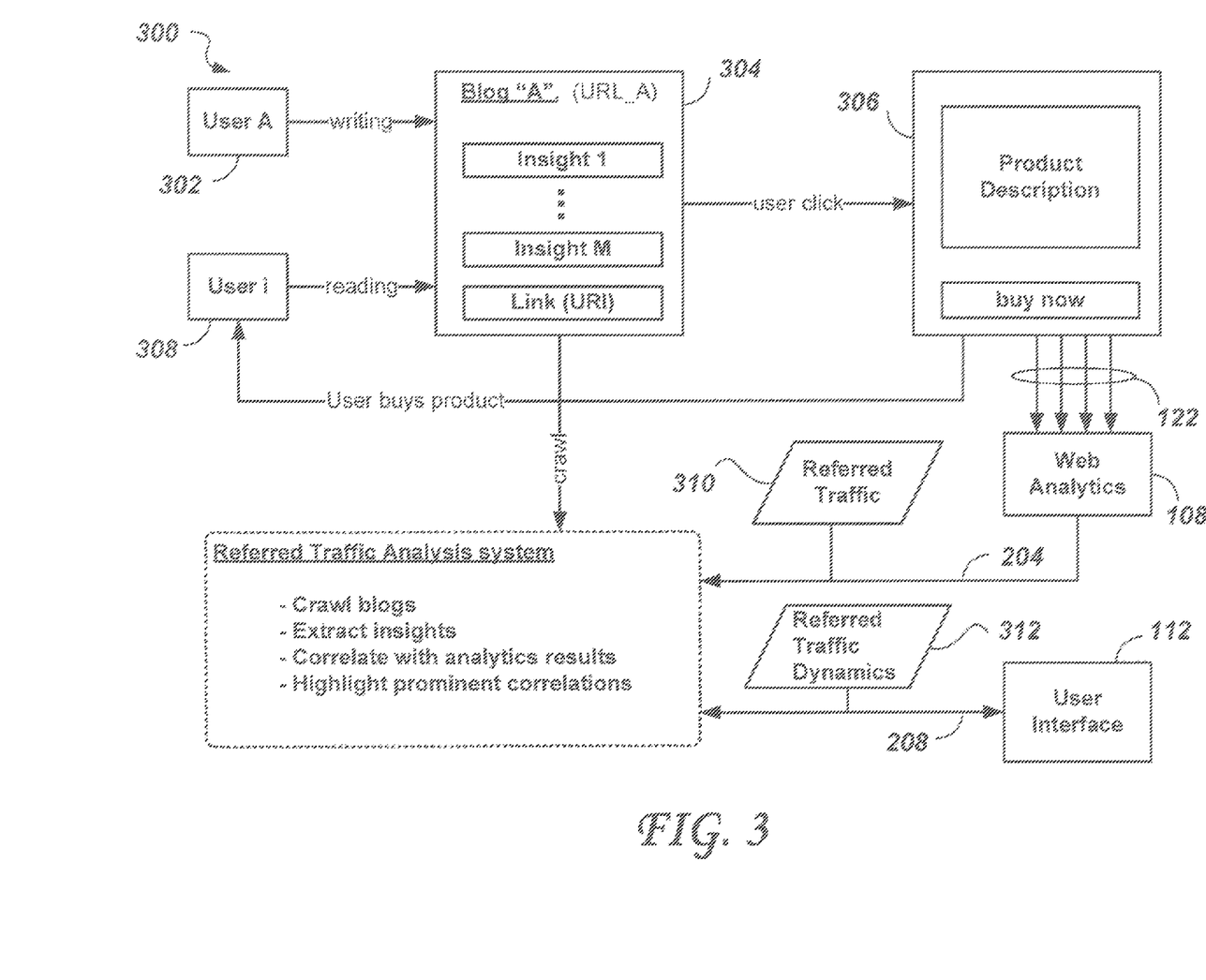
FIG. 3 shows an exemplary use-case diagram 300 illustrating a series of events in the operation of the improved system architecture 200 of FIG. 2.

FIG. 3 shows an exemplary use-case diagram 300 illustrating a series of events in the operation of the improved system architecture 200, illustrating the interaction between a User -A (302), a Blog "A" 304 being an instance of a Referrer Site 102 of FIG. 2 with the URL value "URL_A", a Product Website 306 which is an instance of the Client Website 110 of FIG. 2, a User-i (308), the Web Analytics module 108, and the Referred Traffic Analysis System 202 of FIG. 2.

An arrow labeled "writing" from the User -A (302) to the Blog "A" 304 indicates that the User-A 302 at some time T1 writes this social media blog, which includes the written text as well as a Link (URI) to the Product Website 306.

An arrow labeled "crawl" from the Blog "A" 304 to the Referred Traffic Analysis System 202 indicates that the Web Crawler 206 delivers the URL (=URL_A) and the content of the Blog "A" 304 to the Referred Traffic Analysis System 202 where "insights" contained in the Blog "A" 304 are extracted and stored, with the key "URL A", in the Insights database 212.

An arrow labeled "reading" from the User-i (308) to the Blog "A" 304 indicates that the User-i (308) is reading the block at some later time T2.

An arrow labeled "user click" from the Blog "A" 304 to the Product Website 306 indicates that the User-i (308) has clicked on the Link (URI) in the Blog "A" 304, and thus will be accessing and browsing the Product Website 306 which includes a Product Description and, for example, a "buy now" button which will cause the product described on the Product Website 306 to be bought by the User-i (308).

A set of arrows labeled 122 represent the traffic monitoring link 122 from the Product Website 306 to the Web Analytics module 108 which collects relevant events on the Product Website 306, specifically the URL=URL_A of the Blog "A" 304 through which the Product Website 306 was accessed by the User-i (308), and the conversion event, that is the fact that the User-i (308) has bought the product.

The tracked events on the Product Website 306 due to the visit of User-i (308) are combined by the Web Analytics module 108 into a Referred Traffic listing 310 of tracked events from other user visits, and sent at a time T3 over the analytics output connection 204 to the Referred Traffic Analysis System 202 where it is stored in the Analytics database 216 (see FIG. 2).

The Referred Traffic report may for example include a statement of the form [new visitor, came from URL_A, bought the product], which may be coded in a standard format such as the JavaScript Object Notation (JSON).

If the Blog "A" 304 had not already been crawled before, it is now crawled and its insights and URL are added to the Insights database 212.

The insights Insight 1 to Insight M of the Blog "A" 304 are then correlated in the Referred Traffic Analysis System 202 with relevant events listed in the Referred Traffic listing 310 from the Web Analytics module 108, including the fact that the User-i (308) who is reading the Blog "A" 304 has bought the product.

In a similar way, insights of other blogs, for example, are correlated with the referred traffic attributed to the respective other blogs to generate a Referred Traffic Dynamics data set 312 stored in the RTD database 218. The Referred Traffic Dynamics data set 312 is configured to compute numeric correlations (totals) between specific insights such as "awesome product" and actions such as "bought product". A high relative correlation between a specific insight (awesome product) and the action (bought product) may lead to the plausible assumption that the insight has contributed to the user's decision to buy the product.

Figure 4:
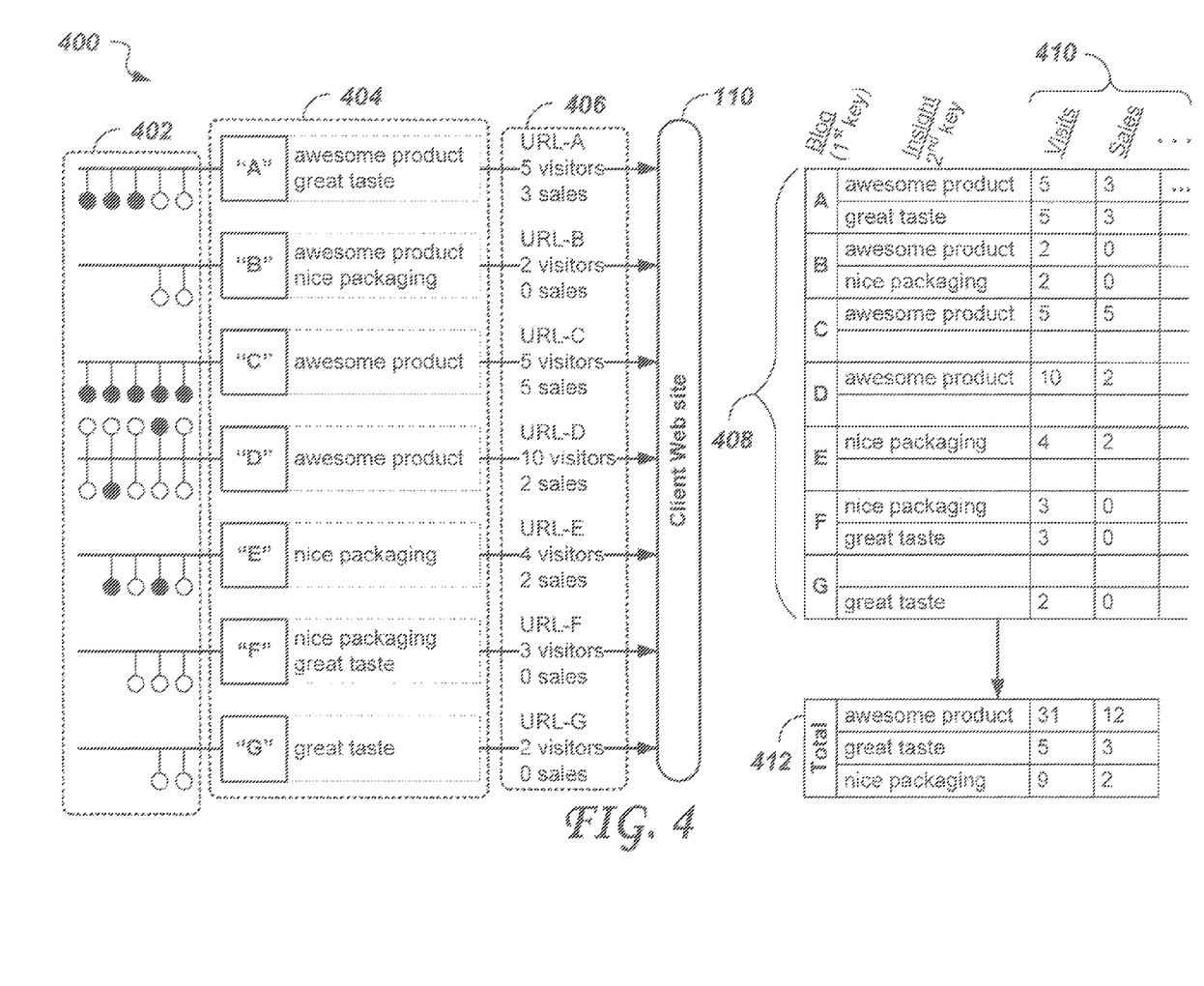
FIG. 4 is an example correlation overview diagram 400 to illustrate the operation of the Referred Traffic Analysis System 202 of FIG. 2.

FIG. 4 is an example correlation overview diagram 400 to illustrate the operation of the Referred Traffic Analysis System 202, showing: a number of blog readers 402; a number of blogs 404 labeled "A" to "G", each blog including a number of insights; a set of referred traffic events 406 relating to each blog when the Client Website 110 is accessed through the respective blog; an Individual Referred Traffic Dynamics table 408; and a Referred Traffic Dynamics Summary table 412.

The blog readers 402 are grouped according to which blog they are reading. Readers which are merely visitors are shown as white circles, readers which ultimately purchase a product are shown as black circles.

The blogs 404, collected by the Web Crawler 206 (FIG. 2), are shown with some insights they contain. The text of each blog may contain many more insights, not shown here because of space constraints. In any case, the insights in each blog were identified by the Collector module 210 (FIG. 2), which has matched the text of each blog against terms in the Insights Dictionary 222. These insights, along with the URL of each blog containing them, are stored in the Insights database 212.

The set of referred traffic events 406 is an example of the Referred Traffic listing 310 (FIG. 3) that was obtained by the Web Analytics module 108 which tracked the traffic activity at the Client Website 110. It was transmitted to the Referred Traffic Analysis System 202 and stored in the Analytics database 216 there. Each record of the set of referred traffic events 406 (referred to as events records) includes the URL of the referrer site, i.e., the blog, and a list of events at the Client Website 110 that pertained to, or originated from, the referrer site. For example, the first event record lists 5 visitors and 3 sales against the URL_A.

The Individual Referred Traffic Dynamics table 408 is computed by combining information from the blog information 404 in the Insights database 212 with the 406 set of referred traffic events 406 in the Analytics database 216 based on the blog URL as the key. The Individual Referred Traffic Dynamics table 408 is divided into rows and columns, the rows being indexed with a primary key based on the name or URL of a blog, e.g., "A", "B", etc., and a secondary key based on the insights, e.g., "awesome product", "nice packaging", etc. in the present example. The columns are indexed by the primary and secondary keys, and by the type of referred traffic event 410, such as "Visits" and "Sales". It is noted that "Visitors" (in the set of referred traffic events 406) and "Visits" (in the Individual Referred Traffic Dynamics table 408) are used interchangeably here, any distinction between repeat visits by the same visitor may or may not be determined by the Web Analytics module 108.

Only two types of referred traffic event 410 are shown in FIG. 4, but there may be more types of referred traffic events 410 recorded by the Web Analytics module 108 and the number of traffic event columns in the Individual Referred Traffic Dynamics table 408 would correspond.

From the Individual Referred Traffic Dynamics table 408 it is then possible for example, that the blog "A" included 2 insights ("awesome product" and "great taste") and produced 5 visits and 3 sales. Similarly, the blog "C" included only one insight ("awesome product") and produced 5 visits and 5 sales.

The data from which the Individual Referred Traffic Dynamics table 408 is generated exists already, partially in the Analytics database 216 and partially in the Insights database 212. Thus, the Individual Referred Traffic Dynamics table 408 may be generated by the Associator module 214 at any time, for example periodically at the times when a report needs to be sent to the client. For the purpose of recording a time history, and for the convenience in subsequent processing, it is convenient to store this table in the RTD database 218 (FIG. 2) however.

The Referred Traffic Dynamics Summary table 412 is computed from the Individual Referred Traffic Dynamics table 408 by omitting the blog identifier and simply aggregating the results according to some a predefined scheme, for example by summing the entries of each types of referred traffic events column against the insights. In the present example, the result is: 31 visits and 12 sales for "awesome product", 5 visits and 3 sales against "great taste", and 9 visits and 2 sales against "nice packaging". Many conclusions may be drawn from such a result, but one might conclude for example, that "awesome product" is the most important insight since it led to the most visits as well as sales, with 39% of visits leading to sales. On the other hand, the insight "nice packaging" does not appear to be as powerful an insight since it only led to 2 sales in 9 visits (22%). But even though the insight "great taste" led to the fewest visits (5) it led to the highest proportion of sales (3, that is 60%). It is also possible to weight the traffic measurement results from different blogs by a weighting factor associated with respective referring blog posts to obtain a product before summing the products. Weighting factors may have been assigned to blogs according to a perceived influence of the blog, specific to the client, for example blogs of product review sites may be assigned a higher weighting factor than blogs from financial news sites.

The content of the RTD database 218 could be made directly available to the client, but preferably the Presenter module 220 is used to provide access to only the client's data, formatting the data for interactive access over the interactive Internet link 208, preprocessing, and thus reducing the amount of data that needs to be transmitted, and most importantly, providing the summarized data as described in the Referred Traffic Dynamics Summary table 412 and derivations of it such as trends etc.

In an alternative embodiment of the invention, the Insights database 212, the Analytics database 216, and the RTD database 218 are combined into a single database stored in a computer readable medium.

Figure 5:
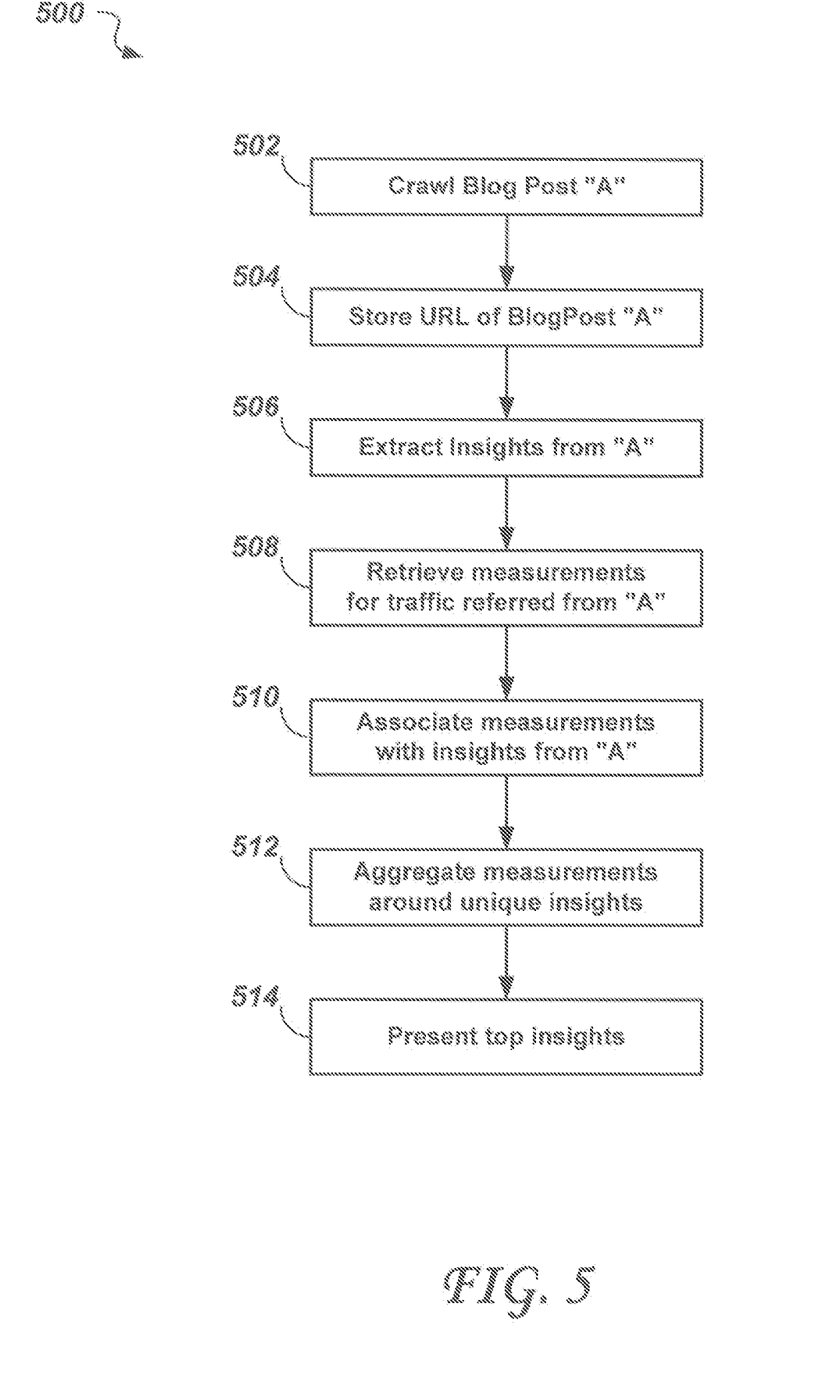
FIG. 5 shows a flow chart 500 summarizing steps performed in the improved system architecture 200 of FIG. 2.

FIG. 5 shows a flow chart 500 summarizing steps performed in the improved system architecture 200 of FIG. 2, including steps:

502: Crawl Blog Post "A";
504: Store URL of Blog Post "A";
506: Extract Insights from "A";
508: Retrieve Measurements for traffic from "A";
510: Associate measurements with insights from "A";
512: Aggregate measurements around unique insights; and
514: Present top insights to the client.

The step 502 (Crawl Blog Post "A") is initiated by the Collector module 210 and carried out by the Web Crawler 206. Blog Post "A" (Blog "A" 304 of FIG. 3) was found by the Web Crawler 206 on the Internet, because it has a reference (a button) pointing to the Client Website 110. In general, all blog posts, as well as other social media sites having a reference to the Client Website 110, are referred to as "referring blog posts", and may be crawled. In particular however, only a subset of the crawled posts that are determined to be influential blog posts, may be evaluated in the Collector module 210. Certain methods for determining influential blog posts have been described in the earlier patent applications of the same assignee cited above.

In the step 504 (Store URL of Blog Post "A"), the URL of the Blog Post "A" is stored by the Collector module 210 in the Insights database 212.

In the step 506 (Extract Insights from "A"), insights are extracted by the Collector module 210 from the content of the Blog Post "A" and stored in the Insights database 212. Extraction is facilitated by the Insights Dictionary 222 of predefined insight tokens. While the insight tokens of the present embodiment of the invention are text elements such as word and phrases, other types of insight tokens, for example emoticons, images, audio files, or other expressions used to indicate an insight on a social media site, are also within the scope of the invention.

In the step 508 (Retrieve Measurements for traffic from "A"), all web analytics measurements are retrieved from the Web Analytics module 108 for traffic to the Client Website 110 that was referred from the Blog Post "A", or generally any traffic that was referred from any of the relevant crawled blog posts, i.e., blog posts that referred traffic to the Client Website 110. The retrieved web analytics measurements are stored in the Analytics database 216 for use in the following step 510.

In the step 510 (Associate measurements with insights from "A"), the retrieved web analytics measurements are associated with the extracted insights from the Blog Post "A", or generally with the extracted insights from all of the relevant blog posts and stored in the Individual Referred Traffic Dynamics table 408 as described in detail above.

In the step 512 (Aggregate measurements around unique insights), the measurements around the unique insights identified and associated in the previous steps, are aggregated into and the aggregated relations stored in the Referred Traffic Dynamics Summary table 412. The number of relevant blog posts may be on the order of thousands.

In the step 514 (Present top insights to the client), the top K (K=10, for example) insights that reoccur frequently enough to appear to be a driver for the measurements observed, are presented to the client. In practice, this means that a certain amount of manual intervention or iteration may be required to determine which insights and which measurements are valuable to the client. The number K of top insights may vary, and may be conveniently selected to be in a range between 5 and 20. It is understood that other values of K are also possible.

The entire process described in the flow chart 500 may be repeated for each client periodically, for example daily or weekly. If retrieved web analytics measurements (in the step 508) are found to contain a URL of a referring blog post, that had not been crawled and is not yet in the Analytics database 216, a special crawl (Step 502) for that missing URL may be initiated, in order to extract the insights of that additional blog post (Steps 504 and 506) before the measurements may be associated (Step 510).

Thus, new methods and systems have been provided for improving the ability to exploit the role of social networking sites in Internet traffic on commercial web sites, and in e-commerce in general.

Any and all software modules described in the present application comprise a computer readable code stored in a computer readable storage medium, for example memory, CD-ROM, DVD or the like, to be executed by a processor.

Although embodiments of the invention have been described in detail, it will be apparent to one skilled in the art that variations and modifications to the embodiments may be made within the following claims.

What is claimed is:

1. A method of compiling marketing information for a client, the method comprising:
   obtaining data from a plurality of social media websites, wherein each of the social media websites includes a universal resource identifier that points to a client website;
   extracting a plurality of insights from the obtained data, resulting in extracted insights, wherein each of the extracted insights comprises text elements that denote product approval for at least one product available for sale at the client website;
   collecting measurements of traffic to the client website, the traffic being referred to the client website by the plurality of social media websites; and
   generating a referred traffic dynamics summary table based on the extracted insights and the measurements of traffic, wherein the referred traffic dynamics summary table aggregates the extracted insights across the plurality of social media websites to rank the extracted insights.

2. The method of claim 1, wherein the referred traffic dynamics summary table ranks the extracted insights in accordance with their value in bringing business to the client.

3. The method of claim 1, wherein the referred traffic dynamics summary table ranks the extracted insights in accordance with an assumption that the extracted insights have contributed to a decision to buy the at least one product available for sale at the client website.

4. The method of claim 1, wherein the obtaining data from the plurality of social media websites, comprises:
   crawling blog posts that appear on the plurality of social media websites to obtain crawled blog posts.

5. The method of claim 4, wherein the crawling comprises:
   crawling blog posts that contain at least one link to the client website.

6. The method of claim 4, wherein the extracting the plurality of insights from the obtained data, resulting in extracted insights, comprises:
   extracting the plurality of insights from the crawled blog posts.

7. The method of claim 6, wherein collecting the measurements of traffic to the client website, comprises:
   collecting the measurements of traffic to the client website, the traffic being referred to the client website by referring blog posts on the plurality of social media websites.

8. The method of claim 7, wherein the collecting comprises:
   collecting one or more events recorded in the client website.

9. The method of claim 8, wherein the collecting comprises recording one or more of the following events:
   visits to the client website;
   number of orders of products from the client website;
   number of orders of products from the client website divided into a category; and
   number of downloads from the client website.

10. The method of claim 6, wherein generating comprises:
    generating a referred traffic dynamics summary table based on the extracted insights and the measurements of traffic, wherein the referred traffic dynamics summary table aggregates the measurements of traffic associated with the extracted insights across the crawled blog posts to rank the extracted insights.

11. A non-transitory computer readable medium having computer readable instructions stored thereon for execution by a processor, the computer readable instructions capable of performing a method for compiling marketing information for a client, the method comprising:
    obtaining data from a plurality of social media websites, wherein each of the social media websites includes a universal resource identifier that points to a client website;
    extracting a plurality of insights from the obtained data, resulting in extracted insights, wherein each of the extracted insights comprises text elements that denote product approval for at least one product available for sale at the client website;
    collecting measurements of traffic to the client website, the traffic being referred to the client website by the plurality of social media websites; and
    generating a referred traffic dynamics summary table based on the extracted insights and the measurements of traffic, wherein the referred traffic dynamics summary table aggregates the extracted insights across the plurality of social media websites to rank the extracted insights.

12. The non-transitory computer readable medium of claim 11, wherein the referred traffic dynamics summary table ranks the extracted insights in accordance with their value in bringing business to the client.

13. The non-transitory computer readable medium of claim 11, wherein the referred traffic dynamics summary table ranks the extracted insights in accordance with an assumption that the extracted insights have contributed to a decision to buy the at least one product available for sale at the client website.

14. The non-transitory computer readable medium of claim 11, wherein the obtaining data from the plurality of social media websites, comprises:
    crawling blog posts that contain at least one link to the client website and that appear on the plurality of social media websites to obtain crawled blog posts.

15. The non-transitory computer readable medium of claim 14, wherein the extracting the plurality of insights from the obtained data, resulting in extracted insights, comprises:
    extracting the plurality of insights from the crawled blog posts.

16. The non-transitory computer readable medium of claim 15, wherein collecting the measurements of traffic to the client website, comprises:
    collecting the measurements of traffic to the client website, the traffic being referred to the client website by referring blog posts on the plurality of social media websites.

17. The non-transitory computer readable medium of claim 16, wherein the collecting comprises:
    collecting one or more events recorded in the client website.

18. The non-transitory computer readable medium of claim 17, wherein the collecting comprises recording one or more of the following events:
    visits to the client website;
    number of orders of products from the client website;

number of orders of products from the client website divided into a category; and number of downloads from the client website.

19. The non-transitory computer readable medium of claim 15, wherein generating comprises:

generating a referred traffic dynamics summary table based on the extracted insights and the measurements of traffic, wherein the referred traffic dynamics summary table aggregates the measurements of traffic associated with the extracted insights across the crawled blog posts to rank the extracted insights.

20. A referred traffic analysis system for compiling marketing information for a client, the referred traffic analysis system comprising:

a processor; and a plurality of modules comprising computer readable instructions stored on a non-transitory computer readable medium for execution by the processor, the modules comprising:

a collector module comprising computer instructions capable of obtaining data from a plurality of social media websites, wherein each of the social media websites includes a universal resource identifier that points to a client website, and extracting a plurality of insights from the obtained data, resulting in extracted insights, wherein each of the extracted insights comprises text elements that denote product approval for at least one product available for sale at the client website;

a web analytics module comprising computer instructions capable of collecting measurements of traffic to the client website, the traffic being referred to the client website by the plurality of social media websites; and an aggregator module comprising computer instructions capable of generating a referred traffic dynamics summary table based on the extracted insights and the measurements of traffic, wherein the referred traffic dynamics summary table aggregates the extracted insights across the plurality of social media websites to rank the extracted insights.

* * * * *